United States Patent [19]

Umehara

[11] Patent Number: 4,902,049
[45] Date of Patent: Feb. 20, 1990

[54] STRUCTURE HAVING INTERCONNECTED METAL TUBES

[75] Inventor: Kazumasa Umehara, Ohhito, Japan

[73] Assignee: Usui Kokusai Sangyo Kabushiki Kaisha, Shizuoka Prefecture, Japan

[21] Appl. No.: 356,798

[22] Filed: May 24, 1989

Related U.S. Application Data

[62] Division of Ser. No. 171,651, Mar. 22, 1988, Pat. No. 4,850,621.

[51] Int. Cl.⁴ .............................................. F16L 17/02
[52] U.S. Cl. ..................... 285/347; 285/382; 285/424; 285/906; 29/451; 29/510
[58] Field of Search .............. 285/424, 382, 322, 906; 29/451, 510, 514, 526 R, 450

[56] References Cited

U.S. PATENT DOCUMENTS

| | | | |
|---|---|---|---|
| 966,513 | 8/1910 | Avery | 285/382 X |
| 1,678,640 | 7/1928 | Hall . | |
| 1,936,669 | 11/1933 | Heeter | 285/382 X |
| 2,413,730 | 1/1947 | Samiran . | |
| 2,457,105 | 12/1948 | Patterson . | |
| 2,498,395 | 2/1950 | Coss | 265/382 |
| 2,556,654 | 6/1951 | Patterson | 285/322 X |
| 2,574,625 | 11/1951 | Coss . | |
| 2,702,716 | 2/1955 | Basolo et al. | 285/322 |
| 4,006,922 | 2/1977 | Bartholomew | 285/424 X |
| 4,113,289 | 9/1978 | Wagner et al. . | |
| 4,398,757 | 8/1983 | Floyd et al. | 285/322 X |
| 4,416,474 | 11/1983 | Miller et al. | 285/322 X |

FOREIGN PATENT DOCUMENTS 7416024  6/1975  Netherlands .

Primary Examiner—Dave W. Arola
Attorney, Agent, or Firm—Anthony J. Casella; Gerald E. Hespos

[57] ABSTRACT

A structure comprising two interconnected metal tubes used for supplying oil or air. The first tube inserted in the second tube has a tubular wall at its one end and an outwardly swelling circumferential wall formed inside the tubular wall. The second tube has plural slots arranged circumferentially. A seal member is sandwiched between both tubes. A binding band is wound around the slots to compress the portion having the slots, for fastening the tubes together.

4 Claims, 2 Drawing Sheets

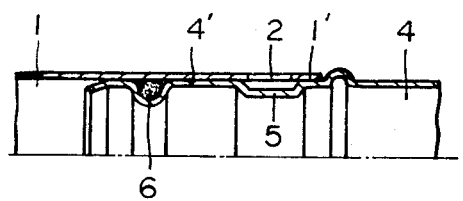
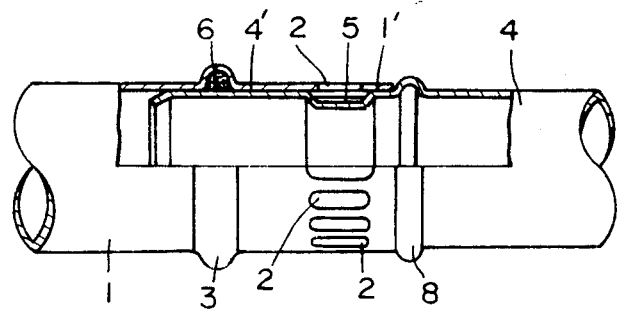
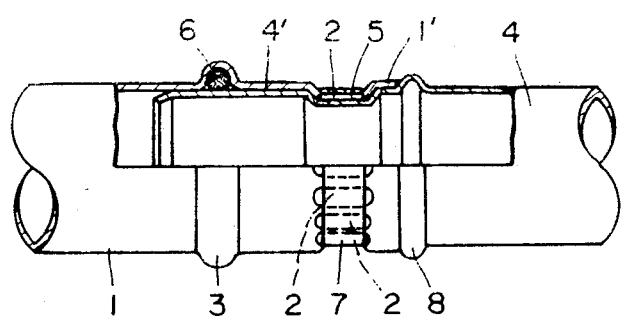

STRUCTURE HAVING INTERCONNECTED METAL TUBES

This application is a divisional application of Ser. No. 171,651 which was filed on Mar. 22, 1988, and now U.S. Pat. No. 4,850,621 issued July 25, 1989.

BACKGROUND OF THE INVENTION

1. Field of the Invention

The present invention relates to metal tubes disposed in automobiles, machines, equipment, devices, or the like to supply air or oil and, more particularly, to a structure in which metal tubes as described above are interconnected at their ends.

2. Description of the Prior Art

A conventional structure of this kind is shown in FIG. 5, where one tube 11 has a plurality of slits 12 at its one fringe. A circumferential recess 13 is formed in the tube 11 inside the slits 12. One end portion of another tube 14 is inserted in one end portion of the tube 11. A seal member 16 is fitted in the recess 13 so as to cover the outer periphery 15 of the tube 14. A band 17 is mounted over the slits 12 to tighten the portion having the slits 12, for fastening both tubes together.

The prior art structure constructed as described above is mounted in an engine, machine, equipment, device, or the like and subjected to vibration. Therefore, the band 17 is often shifted out of position. Then, the binding effect of the band weakens, deteriorating the interconnection.

SUMMARY OF THE INVENTION

It is an object of the present invention to provide a structure in which two metal tubes are interconnected at their ends using a binding band with a small force without creating the possibility that the band is shifted out of position or loosened when the structure is subjected to vibration, whereby the interconnection can be certainly maintained for a long term.

The present invention lies in a structure in which one end portion of a first metal tube is inserted in a second metal tube having slots arranged circumferentially, the first tube having a tubular wall at its one end. The first tube also has an outwardly swelling circumferential wall inside the tubular wall as viewed along the axis of the tube. The second tube engages the circumferential wall either at its one end or at a step portion of an enlarged wall portion formed at the end. The portion having the slots is compressed to press this portion either into the circumferential groove in the first tube or against the circumferential wall. A seal member is sandwiched between both tubes.

The novel structure is constructed as described above, and the second tube is inserted in the first tube such that their end portions overlap. The portion of the first tube which has the slots is placed over the groove or the enlarged wall portion. This portion is compressed by a binding band or the like to press this portion either into the groove or against the swelling wall. Instead of using the band, the two tubes may be fastened together by applying an external force to tighten them radially.

BRIEF DESCRIPTION OF THE DRAWINGS

FIG. 1 is a partially cutaway side elevation of a structure in which metal tubes are interconnected at their ends in accordance with the invention, and in which the tubes are not yet deformed;

FIG. 1A is a fragmentary view similar to a part of FIG. 1, but showing another structure;

FIG. 2 is a view similar to FIG. 1, but in which the tubes have been tightened;

DETAILED DESCRIPTION OF THE PREFERRED EMBODIMENTS

Figure 3A:
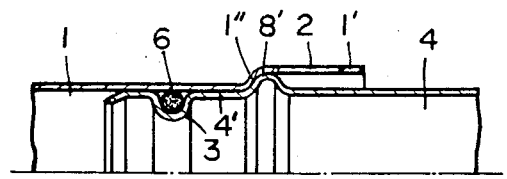
FIG. 3A is a view similar to FIG. 1, but showing a yet other structure.

FIGS. 1-4 show structures according to the invention. It is to be noted that like components are denoted by like reference numerals throughout these figures.

Referring to FIGS. 1 and 2, one tube 1 has an unworked wall portion 1' at its one end. A plurality of slots 2 are formed in the tube 1 circumferentially. A circumferential recessed portion 3 that swells outward is formed in the tube 1 inside the slots 2 as viewed along the axis of the tube. Another tube 4 also has a tubular wall 4' at its one end. A circumferential groove 5 is formed in the tube 4 inside the wall 4'. An outwardly swelling and circumferentially extending stopper wall 8 is formed also inside the wall 4'. One end portion of the tube 4 is inserted in one end portion of the tube 1. A seal member 6 is fitted in the recessed portion 3 in the tube 1 so as to cover the wall 4' of the tube 4. The seal member 6 is made of rubber, a resin, or other material, and acts to seal the tubes 1 and 4 against each other. In the condition shown in FIGS. 1 and 2, the slots 2 in the tube 1 are aligned with the groove 5. A band 7 is attached to the outside of the slots 2 to compress this portion. Also, the band 7 is pressed into the groove 5 to fasten the tubes together.

Referring next to FIG. 1A, a circumferential groove 3 is formed in the wall 4' of the tube 4. A seal member 6 is fitted in the groove 3. The seal member 6 is pressed against the inner surface of the tube 1 to seal this portion in the same manner as in the structure shown in FIG. 1.

Figure 3:
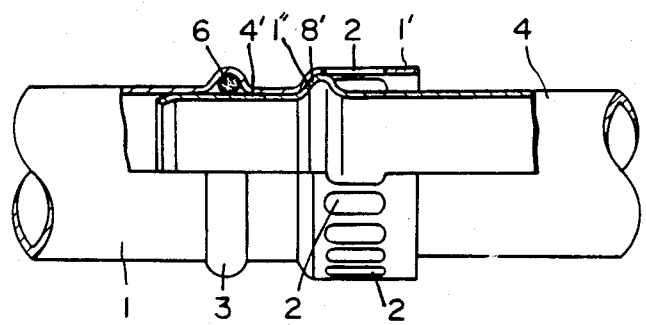
FIG. 3 is a view similar to FIG. 1, but showing a further structure.
Figure 4:
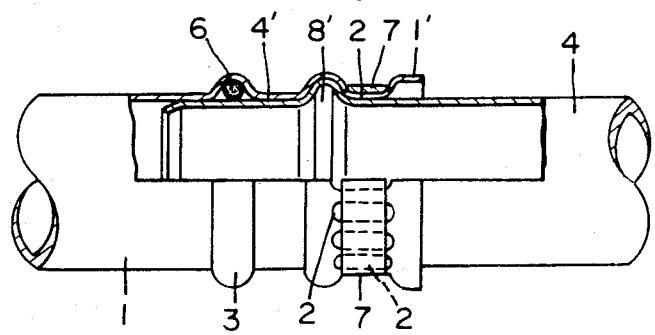
FIG. 4 is a view similar to FIG. 3, but in which the tubes have been tightened.
Figure 5:
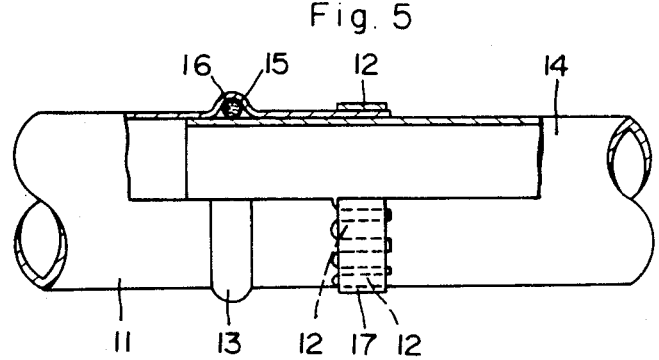
FIG. 5 is a partially cutaway side elevation of a conventional structure comprising interconnected tubes.

Referring to FIGS. 3 and 4, there is shown a structure similar to the structures already described except for the following. The tube 4 is not provided with the circumferential groove 5 and so the tubular wall 4' is unworked. An enlarged wall portion 1' having a step portion 1" is formed at the end of the other tube 1. The step 1" engages the outwardly swelling circumferential wall 8' of the tube 4.

This structure is assembled in the manner described now. One tube 4 is inserted into the other tube 1 in such a manner that the step portion 1" engages the swelling wall 8'. Then the band 7 is wound around the slots 2 to tighten this portion from outside. The portions of the tubes which surround the swelling wall 8' are compressed to fasten both tubes together.

Referring to FIG. 3A, a circumferential recess 3 is formed in the curved wall of the tube 4 so as to surround the wall in the same way as in the structure shown in FIG. 1. A seal member 6 is fitted in this recess 3. The seal member is pressed against the inner surface of the tube 1 in the same way as in the structure shown in FIG. 1.

In the novel structure consisting of interconnected metal tubes, the binding band 7 is pressed into the groove 5 or around the swelling wall 8' to compress the portion of the tube 4 which has slots 2. Thus, the tube 1 can be coupled to the tube 4 with a small force. If this structure is subjected to vibration, it is unlikely that the band 7 shifts out of position or loosens due to such a shift. The interconnection can be retained with certainty for a long term.

What is claimed is:

1. A structure comprising:
a first tube of generally uniform thickness having a substantially cylindrical end portion generally adjacent one axial end, and a circumferential stopper wall spaced from said end and defining an external diameter greater than the diameter of the cylindrical end portion of the first tube;
a second tube of generally uniform thickness having a cylindrical tubular wall portion spaced from one axial end slidably disposed over the end portion of said first tube, said second tube having a step portion intermediate the tubular wall portion and the end of the second tube, the step portion extending outwardly from the cylindrical tubular wall portion of the second tube and being in abutting relationship with the stopper wall of said first tube, an enlarged wall portion intermediate the step portion and the end of the second tube, said enlarged wall portion defining an internal diameter at least as great as the external diameter of the stopper wall of the first tube, a plurality of spaced apart slots formed in said enlarged wall portion and defining a circumferential array of slots thereabout, portions of said second tube intermediate the slots therein being deformed inwardly and engaging the first tube at a location adjacent the stopper was such that the stopper wall is intermediate the deformed portion of the second tube and the step portion thereof;
a generally annular seal disposed intermediate the second tube and the cylindrical portion of the first tube; and
a circumferentially extending fastening means engaging the inwardly deformed portion of said second tube, whereby the slots in said second tube enable the fastening means to deform the second tube inwardly into the first tube for securely fastening said first and second tubes together.

2. A structure as in claim 1 wherein the slots are generally axially aligned and generally parallel to one another.

3. A structure as in claim 1 wherein the second tube includes a seal recess extending outwardly from the tubular wall portion thereof and aligned with the cylindrical portion of the first tube, said seal being retained in the seal recess.

4. A structure as in claim 1 wherein the first tube includes an inwardly extending seal recess formed in the cylindrical portion thereof, said seal being retained in the seal recess.

* * * * *